United States Patent
Frey

(10) Patent No.: US 6,177,130 B1
(45) Date of Patent: Jan. 23, 2001

(54) METHOD OF PREPARING LITHIATED VANADIUM OXIDE-COATED SUBSTRATES OF OPTICAL QUALITY

(75) Inventor: Matthew H. Frey, Maplewood, MN (US)

(73) Assignee: Minnesota Mining and Manufacturing Company, St. Paul, MN (US)

( * ) Notice: Under 35 U.S.C. 154(b), the term of this patent shall be extended for 0 days.

(21) Appl. No.: 09/033,128

(22) Filed: Mar. 2, 1998

(51) Int. Cl.⁷ .............................. B05D 5/06; B05D 3/02; B05D 1/18

(52) U.S. Cl. .................. 427/126.3; 427/108; 427/126.2; 427/165; 427/376.2

(58) Field of Search ................................ 427/108, 126.2, 427/126.3, 165, 376.2

(56) References Cited

U.S. PATENT DOCUMENTS

| | | |
|---|---|---|
| 4,266,335 | 5/1981 | Matsumoto et al. .................. 29/592 |
| 4,347,265 * | 8/1982 | Washo ................................. 427/108 |
| 4,579,594 * | 4/1986 | Nanao et al. .................. 106/287.24 |
| 4,824,222 | 4/1989 | Green .................................. 350/357 |
| 4,855,161 | 8/1989 | Moser et al. ........................ 427/108 |
| 5,039,582 * | 8/1991 | Pistoia ................................ 429/218 |
| 5,171,413 | 12/1992 | Arntz et al. .................... 204/192.15 |
| 5,271,797 | 12/1993 | Kamisawa ........................... 156/635 |
| 5,274,493 | 12/1993 | Couput et al. ...................... 359/275 |
| 5,336,572 * | 8/1994 | Koksbang ........................... 429/218 |
| 5,370,775 | 12/1994 | Parkhe ................................ 204/140 |
| 5,549,880 * | 8/1996 | Koksbang ........................... 423/593 |
| 5,616,309 | 4/1997 | Zachau-Christiansen et al. .. 423/592 |
| 5,699,192 * | 12/1997 | Van Dine et al. .................. 359/269 |
| 5,707,556 * | 1/1998 | Babinec et al. ..................... 252/518 |
| 5,724,175 * | 3/1998 | Hichwa et al. ..................... 359/265 |
| 5,919,571 * | 7/1999 | Badding et al. .................... 428/432 |

FOREIGN PATENT DOCUMENTS

| | | | |
|---|---|---|---|
| 2081922 | 2/1982 | (GB) | ............................... G02F/1/17 |

OTHER PUBLICATIONS

Yu, Aishui et al., "A new method for preparing lithiated vanadium oxides and their electrochemical performance in secondary lithium batteries", Journal of Power Sources 74 (1998) 117–121.

Muranushi, Yoshihisa et al., "Lithium insertion characteristics of vanadium pentoxide and related oxides", Extended Abstracts, vol. 87–02, Oct. 18, 1987, p. 90.

Zhang, X., and R. Frech, "Spectroscopic investigation of $Li_{1+x}V_3O_8$", Electrochimia Acta, vol. 43, No. 8, pp. 861–868, 1998.

Bae et al., "Electrical Properties of B–LixV2O5 Thin Layers Prepared by the Sol–Gel Process", AM. Ceram. Soc., 77(4):891–896.*

Baudry et al., "Electrochromic Window with Lithium Conductive Polymer Electrolyte", *J. Electrochem. Soc.*, 138(2):460–465 (1991).

Goldner et al., "Progress on the variable reflectivity electrochromic window", *SPIE*, 1536:63–69 (1991).

(List continued on next page.)

Primary Examiner—Shrive Beck
Assistant Examiner—Michael Barr
(74) Attorney, Agent, or Firm—Fish & Richardson

(57) ABSTRACT

A method for producing a lithiated vanadium oxide-coated substrate that includes: (a) preparing a solution that includes (i) a solvent, (ii) a soluble lithium source, and (iii) a soluble vanadium source; (b) applying the solution to a substrate to form a coated substrate; and (c) heating the coated substrate to form an optical quality coating that includes lithiated vanadium oxide.

17 Claims, 1 Drawing Sheet

OTHER PUBLICATIONS

Cogan et al., "Variable Transmittance Coatings Using Electrochromic Lithium Chromate and Amorphous $WO_3$ Thin Films", *J. Electrochem. Soc.,* 144(3):956–960 (1997).

Striebel et al., "Electrochemical Behavior of $LiMn_2O_4$ and $LiCoO_2$ Thin Films Produced with Pulsed Laser Deposition", *J. Electrochem. Soc.* 143(6):1821–1827 (1996).

Kanoh et al., "Electrochromic Behavior of a Lambda–$MnO_2$ Electrode Accompanying $Li^+$—Insertion in an Aqueous Phase", *J. Electrochem. Soc.,* 143(3):905–907 (1996).

Plichta et al., "The Rechargeable $Li_xTiS_2/LiAlCl_4/Li_{1-x}CoO_2$ Solid State Cell", *J. Electrochem. Soc.,* 139(6):1509–1513 (1992).

Bae et al., "Electrical Properties of $\beta-Li_xV_2O_5$ Thin Layers Prepared by the Sol–Gel Process", *Am. Ceram. Soc.,* 77(4):891–896 (1994).

Nabavi et al., "Sol–Gel Synthesis of Electrochromic Films", *Material Science and Engineering,* B3:203–207 (1989).

Livage, "Vanadium Pentoxide Gels", *Chem. Mater.,* 3(4):578–593 (1991).

Gummow et al., "Structure and Electrochemistry of Lithium Cobalt Oxide Synthesised at 400° C.", *Mat. Res. Bull.,* 27:327–337 (1992).

Tossici et al., "Study of amorphous and crystalline $Li_{1+x}V_3O_8$ by FTIR, XAS and Electrochemical Techniques" *Solid State Ionics,* 57:227–234 (1992).

* cited by examiner

METHOD OF PREPARING LITHIATED VANADIUM OXIDE-COATED SUBSTRATES OF OPTICAL QUALITY

BACKGROUND OF THE INVENTION

This invention relates to preparing lithiated vanadium oxide coatings of optical quality useful, e.g., as ion-storage counterelectrodes for electrochromic devices.

Electrochromic materials undergo a color change upon oxidation or reduction. In an ion-intercalation electrochromic device, an electrochromic material and an ion-storage counterelectrode material are separated by an ion-conducting electrolyte. The optical properties of the electrochromic material change when ions (e.g., hydrogen ions or metal ions such as lithium ions) intercalated within the structure of the ion-storage material are removed and intercalated within the structure of the electrochromic material in response to an applied electric potential. The ions are removed and returned to the ion-storage material by reversing the polarity of the applied potential, thereby returning the electrochromic material to its original optical state.

A preferred ion-storage material is lithiated vanadium oxide. These materials have been prepared in a number of different ways. According to one process, a solution phase precursor is coated onto an electronically conductive substrate (e.g., an FTO-coated glass substrate) and then heated to generate a vanadium oxide layer. This layer is then charged in a separate step by negatively biasing the vanadium oxide-coated substrate while it is submerged in a lithium ion-containing electrolyte solution to electrochemically insert lithium ions into the oxide layer.

Other processes for preparing lithiated vanadium oxide include physical vapor deposition processes such as sputtering, laser ablation, pulsed laser deposition, and evaporation. These processes, which are typically performed in a vacuum chamber, can be adjusted to yield lithiated material directly, in which case it is not necessary to insert lithium ions in a separate charging step. However, unlike the solution phase processes, many physical vapor deposition processes are not well-suited to producing uniform large-area oxide coatings. They are also relatively expensive.

SUMMARY OF THE INVENTION

In a first aspect, the invention features a method for producing a lithiated vanadium oxide-coated substrate that includes: (a) preparing a solution that includes (i) a solvent, (ii) a soluble lithium source, and (iii) a soluble vanadium source; (b) applying the solution to a substrate to form a coated substrate; and (c) heating the coated substrate to form an optical quality coating that includes lithiated vanadium oxide.

An "optical quality coating" is a coating that is substantially non-light scattering such that when interposed between a viewer and an object such as an emissive display, it does not disrupt the viewability of the object.

"Lithiated vanadium oxide" refers to vanadium oxide containing intercalated lithium ions that is capable of discharging at least some of the lithium ions in response to an applied electric potential. At least some of the vanadium ions in this material exist as $V^{4+}$ ions. Upon application of an electric potential, the $V^{4+}$ ions are oxidized to form $V^{5+}$ ions, which is coincident with the discharge of lithium ions.

A "soluble" lithium or vanadium source means that the source dissolves in the solvent at room temperature or upon heating.

The method yields lithiated vanadium oxide coatings that may be used "as is." If desired, however, the lithiated vanadium oxide coating may be charged in a separate step with additional lithium ions. In the case of electrochromic devices, where the lithiated vanadium oxide coating acts as a supply of lithium ions for a material such as tungsten trioxide that exhibits the primary electrochromic behavior, including additional lithium ions results in devices with greater reversible optical dynamic range.

The lithiated vanadium oxide coating preferably is substantially amorphous, as evidenced by an x-ray diffraction pattern that lacks sharp diffraction peaks characteristic of crystalline material. The solvent is preferably an organic solvent, particularly where the solution is applied to a glass substrate. Examples of preferred organic solvents include methanol, ethanol, and combinations thereof. The coating solution may be prepared in a variety of ways. In one embodiment, the solution is prepared by combining lithium hydroxide, lithium hydroxide monohydrate, or a combination thereof and vanadium pentoxide with an organic solvent. In another embodiment, the solution is prepared by combining lithium hydroxide, lithium hydroxide monohydrate, or a combination thereof and vanadium pentoxide or vanadic acid (prepared, e.g., by acidifying a metavanadate salt such as sodium or ammonium metavanadate) in the presence of water to form an aqueous solution, drying the aqueous solution to remove water and form an intermediate that includes lithium and vanadium, and combining the intermediate with an organic solvent.

The solution is preferably applied to the substrate by dip coating. The coated substrate is preferably heated at a temperature of greater than or equal to about 150° C., but no greater than about 350° C., to form the optical quality, lithiated vanadium oxide coating.

In a second aspect, the invention features a method for preparing an electrochromic device that includes coating a substrate bearing an electronic conductor according to the above-described process to form a substrate bearing an optical quality, lithiated vanadium oxide coating on the electronic conductor, and combining that coated substrate with (i) a second substrate that includes an electronic conductor and an electrochromic material deposited on the conductor and (ii) an electrolyte, to form the electrochromic device. The electrochromic material preferably includes tungsten trioxide. The electrolyte preferably includes a solid, lithium ion-conducting, polymeric electrolyte.

The invention provides a solution phase process for preparing optical quality, lithiated vanadium oxide coatings. The process is particularly useful for preparing uniform, optical quality, large scale coatings on relatively flat, smooth surfaces. Because the coatings are in lithiated form following the heating step, it is not necessary to charge the coatings in a separate operation, thereby simplifying manufacture. In addition, the process does not require complex vacuum equipment of the type used in physical vapor deposition processes such as sputtering.

Other features and advantages of the invention will be apparent from the following description of the preferred embodiments thereof, and from the claims.

DETAILED DESCRIPTION

Figure 1:
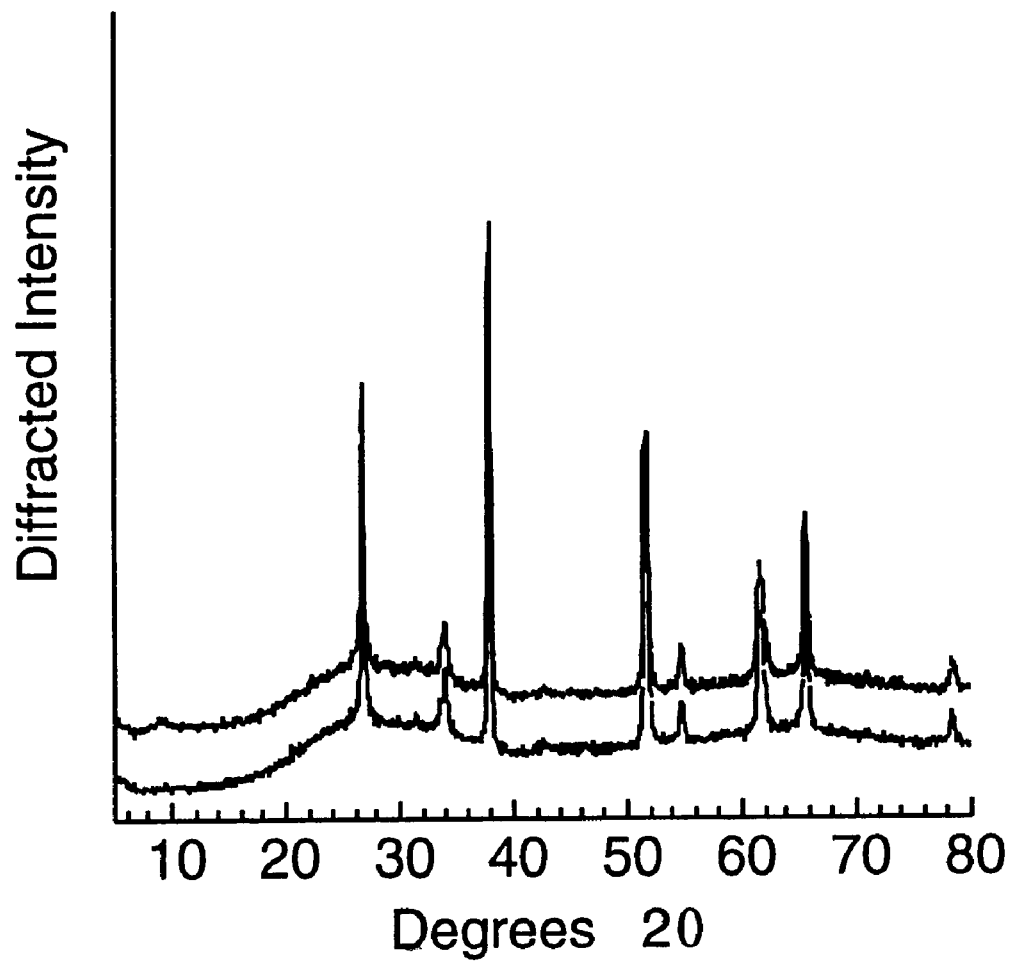
FIG. 1 depicts x-ray diffraction data for both a fluorinated tin-oxide/glass substrate and a fluorinated tin-oxide/glass substrate further provided with an amorphous lithiated vanadium oxide coating according to the invention.

The invention features a solution phase method for producing an optical quality, lithiated vanadium oxide-coated substrate that may be used "as is," i.e., without the need for a separate, post-preparation, lithium ion charging step. The substrate may be flexible or rigid. Examples of suitable substrates include rigid glass substrates and flexible plastic films such as polyethylene terephthalate and polycarbonate, with the glass substrates being preferred. Where the substrate is designed for use, e.g., in a battery or electrochromic device, the substrate further includes an electronic conductor such as indium tin-oxide (ITO), fluorinated tin-oxide (FTO), or a thin layer of a metallic material such as gold or platinum.

In general, the lithiated vanadium oxide-coated substrates are prepared by applying a coating solution to the substrate that contains (a) solvent, (b) a soluble lithium source, and (c) a soluble vanadium source to form a coated substrate, followed by heating the coated substrate to form a lithiated vanadium oxide coating. The ratio of lithium to vanadium in the coating solution is selected to yield an optical quality coating following heating, and to maximize initial lithium discharge density. The particular ratio is a function of variables such as the solvent and the temperature of the heat treatment. In general, however, it ranges from about 0.33:1.00 to about 0.70:1.00, with ratios of about 0.50:1.00 being preferred.

Suitable coating application methods include dip coating, spin coating, spray coating, and meniscus coating, with dip coating being preferred. In the case of dip coating, dip speeds of about 10–20 cm/minute have been found to be useful.

The final coating thickness is application-dependent. For example, in the case of electrochromic devices, the coating must not be so thick that the whole device appears dark in the bleached state, yet must be thick enough to hold a sufficient number of lithium ions for the desired optical dynamic range. In general, however, coating thicknesses range from about 100 to about 800 nm. The percent solids content of the coating solution is selected based upon the desired thickness of the final coating.

The solvent must be capable of wetting the substrate surface to produce a substantially uniform coating on the substrate. It must also be sufficiently volatile such that it can be removed during the heating step. The solvent may be an organic solvent or water, with organic solvents being preferred in the case of glass substrates. Examples of suitable solvents include lower alkyl alcohols such as methanol, ethanol, and combinations thereof.

The coating solution may be prepared according to a number of different ways. For example, a lithium-containing compound and a vanadium-containing compound may be combined with a solvent to form a solution having a lithium source and a vanadium source, and the resulting solution coated directly onto the substrate. It is also possible to combine the lithium-containing compound and the vanadium-containing compound in a first solvent to form a solution, followed by removing the solvent to form a solid and then re-dissolving the solid in a different solvent to form the ultimate coating solution. For example, the initial solution can be an aqueous solution. Following removal of water, the resulting solid, which includes lithium and vanadium, can be redissolved in an organic solvent such as methanol or ethanol, and then coated onto a substrate.

Examples of suitable lithium-containing compounds include lithium hydroxide and lithium hydroxide monohydrate. Examples of suitable vanadium-containing compounds include vanadium pentoxide and vanadium dioxide powder. When combined, these compounds form a source of lithium and vanadium, which may be different from the original lithium- and vanadium-containing compounds, that is converted to lithiated vanadium oxide upon heating. It is also possible to use a single compound that contains both lithium and vanadium such as $LiV_3O_8$ or lithiated vanadium pentoxide powder.

Another way to provide a source of vanadium for the coating is to acidify an aqueous solution of, e.g., sodium or ammonium metavanadate to form a vanadic acid solution. Acidification may be accomplished using conventional methods such as contacting the metavanadate solution with an ion-exchange resin such as Amberlite IR-120 acidic ion-exchange resin (a polymer gel with sulfonic acid functionality that is commercially available from Aldrich Chemical Co. of Milwaukee, Wis.). To prevent gelation, the vanadic acid solution can be neutralized, e.g., with lithium hydroxide or lithium hydroxide monohydrate, to increase the pH to above about four. The resulting solution is generally stable, and can be stored indefinitely or dried to a solid without precipitation or gelation. It can also be re-dissolved, e.g., in alcohol to form the coating solution.

Following application of the coating solution to the substrate, the coated substrate is heated to form a lithiated vanadium oxide coating. Heating is conducted in air using an apparatus such as a box furnace; alternatively, heating may be conducted under a nitrogen or argon atmosphere. The heating temperature is selected such that it is high enough to drive off solvent and effect conversion of the lithium and vanadium sources to lithiated vanadium oxide, but below the point at which the coating darkens and/or becomes hazy in order to generate an optical quality coating. In general, the heating temperature is at least about 150° C., but no greater than about 350° C. Heating times are typically on the order of about 10 to 30 minutes.

The lithiated vanadium oxide coatings are preferably substantially amorphous, as evidenced by an x-ray diffraction pattern that lacks sharp diffraction peaks characteristic of crystalline material. Substantially amorphous coatings exhibit superior lithium insertion and discharge properties relative to crystalline material.

The lithiated vanadium oxide coatings are durable in the sense that they are substantially insoluble in water and resist scratching, and are of optical quality. The latter is determined by visual inspection and is characterized by a substantial lack of haziness.

The coatings can have a variety of initial discharge densities, with the particular value being selected based upon the application for which the coating is designed. For example, in the case of electrochromic devices, the initial discharge density affects the extent of the change in optical transmission upon coloration or bleaching. In general, useful optical changes require initial discharge densities on the order of at least about 3–4 mC of lithium ions per square centimeter of coating area, measured using a standard three-electrode cell. If desired, the lithium ion content of the coating may be further increased by electrochemically charging the coating as follows.

The coated substrate is immersed in an electrolyte solution containing a lithium electrolyte salt dissolved in organic solvent. A useful solution is a 0.1M solution of lithium trifluoromethanesulfonimide (available as HG-115 from 3M, St. Paul, Minn.) or lithium trifluoromethanesulfonate (available as FC-122 from 3M, St. Paul, Minn.) in acetonitrile, or lithium perchlorate in propylene carbonate. A platinum auxiliary electrode and a Ag/AgCl reference electrode are immersed in the solution along with the coated substrate (which forms the test electrode). Each electrode (including the coated substrate) is connected to a potentiostat (e.g., a Model 100B, available from Bioanalytical Systems, West Lafayette, Ind. or Model 362, available from EG&G PARC, Princeton, N.J.) that applies a −1.0V bias on the coated substrate. The potentiostat supplies electrons to the coating as lithium ions are inserted. A coulometer placed in series with the potentiostat is used to integrate the electrical current and display the total amount of inserted lithium ions.

The optical quality, lithiated vanadium oxide-coated substrates are particularly useful as ion storage components in, e.g., electrochromic devices. For such applications, the substrate includes an electronic conductor on which the coating is deposited. The coated substrate is combined with another electronic conductor-bearing substrate that includes a layer of an electrochroric oxide of a group IV, V, VI, and/or VIII metal such as tungsten trioxide deposited thereon. The electrochromic layer-bearing substrates are well-known and may be prepared according to methods known in the art.

The two substrates are separated by an ion-conducting electrolyte. The electrolyte is preferably a polymer electrolyte. Examples of suitable polymers include polysiloxanes and siloxane copolymers (e.g., high molecular weight polysiloxanes having a molecular weight of at least 20,000), polyalkylene oxides (e.g., polyethylene oxide), polyacrylates, polyvinyl alcohol, polyvinyl acetal, polyvinyl acetate, the crosslinked product of thiol and ene monomers, and poly-2-acrylamide-2-methypropane sulfonic acid ("polyAMPS"), as well as copolymers thereof. The electrolyte may be generated in situ by combining a polymerizable electrolyte precursor, in the form of a viscous liquid, with the two substrates and then exposing the precursor to actinic radiation, e.g., ultraviolet radiation to generate the polymer electrolyte. The polymers, if desired, may be swollen with solvent or combined with tackifiers in order to increase the tackiness of the polymer or modify the ionic conductivity.

If desired, a thin (c. a. 500 angstrom) barrier layer may be provided between the electrolyte and the lithiated vanadium oxide-coated substrate to isolate the electrolyte from the lithiated vanadium oxide coating, and thereby extend the lifetime of the device. Examples of suitable barrier layers are well-known and include tungsten oxide, nickel oxide, and niobium oxide.

The invention will now be described further by way of the following examples.

EXAMPLES

Example 1

A stock solution containing 8% by weight sodium metavanadate in water was prepared by adding sodium metavanadate powder (commercially available from Fluka) to deionized water with stirring, while heating to about 50° C. Next, 2550 g of the aqueous sodium metavanadate solution was acidified by passing it through 1800 mL of Amberlite IR-120 ion-exchange resin (Aldrich Chemical Co.). The pH of the acidified solution was less than two. Immediately following acidification, an aqueous solution of lithium hydroxide, prepared by adding 85.98 g of lithium hydroxide monohydrate to 605 g of water with stirring at room temperature, was added to the acidified solution in an amount sufficient to raise the pH of the acidified solution to about 5. The resulting partially neutralized coating solution weighed 3888 g. Inductively coupled plasma emission spectroscopy (ICP) revealed a Li:V ratio of 0.56:1.00.

Example 2

A solution was prepared following the general procedure of Example 1 except that the resulting solution had a Li:V ratio of 0.49:1.00, as measured by ICP. 49.96 g of this solution was dried by rotary vacuum evaporation at 40° C. to an orange solid. The solid weighed 2.04 g. The solid was combined with 25 g of methanol with stirring at room temperature. Within 5 minutes, the solid dissolved in the methanol to yield a clear orange coating solution having a solids content of 5.5% by weight. The solution was then used to coat a substrate as follows.

A piece of glass (thickness=2.3 mm) bearing a pyrolytic fluorinated tin oxide transparent conductor film having a sheet resistance of 15 ohm/square (LibbeyOwens-Ford, Toledo, Ohio) on one side was used as a substrate. The substrate was dip-coated with the clear orange coating solution using a withdrawal rate of 20 cm/min. to form a coated area measuring 10.7 $cm^2$. The coated substrate was placed in a box furnace and heated at 190° C. for 20 minutes. Following heat treatment, the coating did not scratch easily upon handling, did not rapidly dissolve in water, and was substantially haze-free.

The discharge properties of the coated substrate were evaluated using an electrochemical test apparatus consisting of a BAS CV-27 voltammograph with integrated coulometer and a three electrode cell containing the coated substrate (which formed the test electrode), a Ag/AgCl reference electrode, a platinum auxiliary electrode, and a 0.1M solution of lithium trifluoromethanesulfonimide in acetonitrile as the electrolyte. The amount of lithium discharged from the cell was measured using an applied voltage of +1.0V. The coated substrate exhibited an initial discharge density of 3.6 $mC/cm^2$.

Example 3

A coating solution was prepared following the procedure of Example 2 except that 49.98 g of solution was dried by rotary vacuum evaporation at $40°C$ to yield 2.15 g of an orange solid having a Li:V ratio of 0.49:1.00, as measured by ICP. The solid was combined with 25 g of ethanol while stirring and then heated to reflux. Within 10 minutes, the solid dissolved to yield a clear orange coating solution having a solids content of 5% by weight.

The solution was used to coat a substrate following the procedure of Example 2. The coated substrate exhibited an initial discharge density of 6.1 $mC/cm^2$.

Example 4

An aqueous solution was prepared by dissolving 1.75 g of lithium hydroxide monohydrate in 40.81 g of water. Next, 7.50 g of vanadium pentoxide powder was added with stirring. The Li:V ratio of the solution was calculated to be 0.51:1.00. The mixture was then warmed to 80° C. Within 40 minutes, the vanadium pentoxide powder dissolved to yield a solution having a pH of about 5. The aqueous solution was dried by rotary vacuum evaporation at 40° C. to yield 11.93 g of an orange solid. The solid was combined with 51.95 g of methanol with stirring at room temperature. Within minutes, the solid dissolved in the methanol to yield a clear orange coating solution having a solids content of 12% by weight.

The solution was used to coat a substrate following the coating procedure of Example 2, with the exception that the dip-coating withdrawal rate was 12 cm/min., yielding a coated area measuring 9.5 $cm^2$. The coated substrate exhibited an initial discharge density of 4.7 $mC/cm^2$.

Example 5

A solution was prepared by dissolving 1.73 g of lithium hydroxide monohydrate in 54.80 g of methanol. The solution was slightly turbid. Next, 7.50 g of vanadium pentoxide powder was added with stirring. The Li:V ratio of the solution was calculated to be 0.50:1.00. The mixture was then heated to reflux. After about 3 hours, the solution was a slightly turbid orange solution. After a trace of a greenish solid was allowed to settle, a clear orange supernatant coating fluid having a solids content of 12% by weight was formed.

The fluid was used to coat a substrate following the coating procedure described in Example 4, with the exception that the coated area measured 10.2 $cm^2$. The coated substrate exhibited an initial discharge density of 7.2 $mC/cm^2$.

Example 6

A solution was prepared by dissolving 0.86 g of lithium hydroxide monohydrate in 54.80 g of ethanol. After stirring and heating to 60° C., the hydroxide dissolved partially in the alcohol. Next, 3.75 g of vanadium pentoxide powder was added with stirring. The mixture was refluxed for 4 hours with stirring. After a trace of a greenish solid was allowed to settle, a clear orange supernatant coating fluid having a solids content of 7% by weight was formed. The Li:V ratio was calculated to be 0.50:1.00.

The fluid was used to coat a substrate following the coating procedure described in Example 2, with the exception that the coated area measured 9.7 $cm^2$. The coated substrate exhibited an initial discharge density of 7.4 $mC/cm^2$.

Example 7

A solution was prepared by dissolving 0.28 g of lithium hydroxide in 27.50 g of methanol. The solution was slightly turbid. Next, 2.10 g of vanadium pentoxide powder was added with stirring. The Li:V ratio of the solution was calculated to be 0.51:1.00. The mixture was then heated to reflux. After about 5 hours, the solution was a slightly turbid orange solution. After a trace of solid was allowed to settle, a clear orange supernatant coating fluid having a solids content of 7% by weight was formed.

The fluid was used to coat a substrate following the coating procedure described in Example 2, with the exception that the heat treatment was conducted at 250° C. and the coated area measured 10.7 $cm^2$. The coated substrate exhibited an initial discharge density of 7.1 $mC/cm^2$.

Example 8

A coating solution was prepared following the procedure of Example 3 except that the Li:V ratio was calculated to be 0.33:1.00. In addition, the coating solution had a solids content of 7% by weight.

The solution was used to coat a substrate following the procedure of Example 2 except that the coated substrate was heated in air at 175° C. for 20 minutes. X-ray diffraction data was recorded on the resulting coated substrate using a Philips vertical diffractometer equipped with a Philips APD 3100 copper K alpha source in the standard theta/2 theta scanning mode. For comparison, x-ray diffraction data was also recorded using the fluorinated tin oxide substrate alone. The results are shown in FIG. 1. The only sharp diffraction peaks in the diffraction trace of the lithiated vanadium oxide-coated substrate are attributable to the fluorinated tin oxide-coated glass substrate, demonstrating that the lithiated vanadium oxide coating is substantially amorphous.

Example 9

This example describes the production of an electrochromic device.

A glass substrate bearing a pyrolytic fluorinated tin oxide transparent conductor, as described in Example 2, and a lithiated vanadium oxide coating was prepared according to Example 2 except that the coating solution had a solids content of 10.6 weight percent. An identical conductive glass substrate was coated on the conductive side with a tungsten trioxide coating prepared according to the sol gel process described in Bailey et al., U.S. Ser. No. 08/639,020 filed Apr. 24, 1996 now U.S. Pat. No. 5,772,978 and entitled "Process for Producing Tungsten Oxide," which is assigned to the same assignee as the present application and hereby incorporated by reference. The coating solution was an ethanol-based polytungstate solution having 18% by weight solids. The coating was applied to the substrate by dip coating using a dip speed of 20 cm/minute. The coated substrate was then fired in a box furnace in air at 225° C. for 20 minutes to form the tungsten trioxide coating.

The lithiated vanadium oxide-bearing substrate and the tungsten trioxide-bearing substrate were laminated together using a polymerizable, lithium salt-containing, polymeric electrolyte precursor composition to separate the two substrates. The electrolyte precursor composition was prepared by combining 63.6% by weight of methoxy(polyethylene oxide)methacrylate monomer (available from Shin Nakamura Chemical Co. of Japan), 36.3% by weight of a lithium salt (lithium perfluorobutanesulfonate), and 0.1% by weight of 2,2-dimethoxy-2-phenylacetophenone initiator (available from Sartomer of Exton, Pa. under the designation Esacure KB1). Following lamination, the electrolyte precursor composition was cured by exposure for 20 minutes to ultraviolet radiation from an ultraviolet lamp equipped with two 15 Watt Sylvania 350 blacklight bulbs to form a polymeric electrolyte. The lamp was positioned about 3.5 inches from the laminate.

Using a potentiostat, the device was driven with (+) and (−) DC voltage signals of 2.5V across the two transparent electrodes to switch the device reversibly between two different transmission states. The device exchanged 10 $mC/cm^2$ of lithium ions between the two coated substrates.

The optical properties of the device were measured using an integrated optical densitometer featuring a quartz halogen lamp Type 2604-A equipped with a blue filter (Photographic Type 80-A) as a light source that corrects temperature to approximate day light. The detector was a crystalline silicon photodiode. The device could be reversibly switched between average integrated optical transmission values of 24% and 62%.

Other embodiments are within the following claims.

What is claimed is:

1. A method for producing a lithiated vanadium oxide-coated substrate comprising:
   (a) preparing a solution comprising (i) a solvent, (ii) a soluble lithium source, and (iii) a soluble vanadium source;
   (b) applying said solution to a substrate to form a coated substrate; and
   (c) heating said coated substrate to form an optical quality coating comprising lithiated vanadium oxide.

2. A method according to claim 1 further comprising charging said lithiated vanadium oxide coating with additional lithium ions.

3. A method according to claim 1 wherein said solvent comprises an organic solvent.

4. A method according to claim 3 wherein said organic solvent is selected from the group consisting of methanol, ethanol, and combinations thereof.

5. A method according to claim 1 wherein preparing said solution comprises combining lithium hydroxide, lithium hydroxide monohydrate, or a combination thereof and vanadium pentoxide with an organic solvent.

6. A method according to claim 1 wherein preparing said solution comprises combining lithium hydroxide, lithium hydroxide monohydrate, or a combination thereof and vanadium pentoxide in the presence of water to form an aqueous solution, drying said aqueous solution to remove water and form an intermediate comprising lithium and vanadium, and combining said intermediate with an organic solvent.

7. A method according to claim 1 wherein preparing said solution comprises combining lithium hydroxide, lithium hydroxide monohydrate, or a combination thereof and vanadic acid in the presence of water to form an aqueous solution, drying said aqueous solution to remove water and form an intermediate comprising lithium and vanadium, and combining said intermediate with an organic solvent.

8. A method according to claim 7 wherein said vanadic acid is prepared by acidifying a metavanadate salt.

9. A method according to claim 1 comprising dip coating said substrate with said solution to form said coated substrate.

10. A method according to claim 1 comprising heating said coated substrate at a temperature greater than or equal to about 150° C.

11. A method according to claim 1 comprising heating said coated substrate at a temperature no greater than about 350° C.

12. A method according to claim 1 comprising heating said coated substrate at a temperature between about 150° C. and about 350° C.

13. A method according to claim 1 wherein said substrate comprises glass.

14. A method according to claim 1 wherein said optical quality coating comprises substantially amorphous lithiated vanadium oxide.

15. A method for preparing an electrochromic device comprising:
 (a) preparing a solution comprising (i) a solvent, (ii) a soluble lithium source, and (iii) a soluble vanadium source;
 (b) applying said solution to a substrate to form a coated substrate,
 said substrate comprising an electronic conductor to which said solution is applied;
 (c) heating said coated substrate to form an optical quality coating comprising lithiated vanadium oxide; and
 (d) combining the product of step (c) with (i) a second substrate comprising an electronic conductor and electrochromic material deposited on said conductor and (ii) an electrolyte to form an electrochromic device in which said electrolyte is interposed between said lithiated vanadium oxide and said electrochromic material.

16. A method according to claim 15 wherein said electrochromic material comprises tungsten trioxide.

17. A method according to claim 15 wherein said electrolyte comprises a solid, lithium ion-conducting, polymeric electrolyte.

\* \* \* \* \*

UNITED STATES PATENT AND TRADEMARK OFFICE
CERTIFICATE OF CORRECTION

PATENT NO.    : 6,177,130 B1
DATED         : January 23, 2001
INVENTOR(S)   : Frey, Matthew H.

It is certified that error appears in the above-identified patent and that said Letters Patent is hereby corrected as shown below:

<u>Title page,</u>
OTHER PUBLICATIONS, "Electrochimia" should read -- Electrochimica --;

<u>Column 2,</u>
Line 16, after "thereof.", a new paragraph should begin with -- The coating --;

<u>Column 4,</u>
Line 5, "LiV$_3$Os" should read -- LiV$_3$O$_8$ --;

<u>Column 5,</u>
Line 29, "methypropane" should read -- methylpropane --;

<u>Column 6,</u>
Line 13, "LibbeyOwens" should read -- Libbey-Owens --; and
Line 40, "40$^B$C" should read -- 40ºC --.

Signed and Sealed this

Fourth Day of June, 2002

Attest:

*Attesting Officer*

JAMES E. ROGAN
*Director of the United States Patent and Trademark Office*